United States Patent [19]

Owusu-Ansah et al.

[11] Patent Number: 5,424,081
[45] Date of Patent: Jun. 13, 1995

[54] CHEWING GUM

[75] Inventors: Yaw J. Owusu-Ansah; Richard C. Green, both of Saskatoon; Ervin McGrath, Leroy, all of Canada

[73] Assignee: McGrath Farms, Saskatchewan, Canada

[21] Appl. No.: 144,450

[22] Filed: Nov. 2, 1993

[51] Int. Cl.$^6$ ............................................. A23G 3/30
[52] U.S. Cl. ........................................ 426/4; 426/516; 426/656
[58] Field of Search ............................ 426/3-6, 426/516, 656

[56] References Cited

U.S. PATENT DOCUMENTS

| 2,469,861 | 5/1949 | Cohoe | 426/3 |
| 3,255,018 | 6/1966 | Comollo | 426/4 |
| 3,651,768 | 3/1972 | Hyppola | 99/94 |

FOREIGN PATENT DOCUMENTS

| 2232218 | 6/1973 | Germany . | |
| 37-13701 | 9/1962 | Japan . | |
| 52-96771 | 8/1977 | Japan . | |

*Primary Examiner*—Jeanette Hunter
*Attorney, Agent, or Firm*—Antonelli, Terry, Stout & Kraus

[57] ABSTRACT

A non-adhesive chewing gum base comprising a gluten component and a protein condensing agent which promotes cross-linking among gluten proteins forming the gluten component. Preferably the gluten is a wheat gluten and the protein condensing agent is a tannin. The base may also comprise an emulsifying agent, a plasticizing agent and whole wheat flour. Sweeteners, flavors and colors may be added to the gluten-based mixture to produce a desirable chewing gum. The gluten-based chewing gum is light in texture and will not adhere to dentures or fillings when chewed. Ingredients in the gluten-based chewing gum are all natural and will not be harmful if the gum is accidentally swallowed. The chewing gum is formed through low temperature extrusion or by freeze fragmentation processes.

13 Claims, No Drawings

CHEWING GUM

FIELD OF THE INVENTION

The present invention relates to a novel chewing gum base prepared from gluten and a protein condensing agent such as a tannin. The invention also relates to methods for preparing the chewing gum base composition.

DESCRIPTION OF THE PRIOR ART

Chewing gums available today generally contain a water insoluble, chewable, plastic gum base prepared from comestible natural or synthetic elastomers and optionally, a resin or wax component. Incorporated with the gum base, and in intimate admixture therewith, may be plasticizers, and bulking agents to improve consistency and to generally enhance the chewing experience.

There have also been attempts in the past to prepare chewing gums where wheat gluten or gluten combined with prolamine bases such as hordein of barley and the zein of maize has been used as the gum base. (U.S. Pat. No. 2,469,861; German Patent #P,22 32 218.5-44; Japanese Patent Apl. #13 70162. These chewing gums have quite beneficial properties in comparison to those which are produced from other gum bases such as polyvinyl acetate, polyvinylpyrolidone and natural gum resins. For example, they have the advantage of being made from edible natural products, and because they are composed of protein, are not harmful if swallowed, rather, they contribute to nourishment of the individual. Such chewing gums, however, have disadvantages in that gluten has a low viscoelasticity and chewing gums prepared from them are generally too soft, and hence, not very pleasant to chew. Gluten has a light texture and can take on a slimy mouthfeel after it absorbs moisture in the mouth.

Other preparations have used wheat gluten and treated the isolated gluten solution with heat to partially denature it, then incorporated bridging agents to the gluten and heat denatured it in order to provide elasticity to the composition (Jpn. Patent Apl. #Sho54-44071 and German Patent P, 22 32 218.5-44). Partially denaturing the vital gluten thermally by 10-60 wt. % causes crosslinking between the gluten proteins and imparts good chewing properties to the mixture. The denatured gluten has also been freeze dried, and utilized as a powder which requires rehydration before consumption (Jpn. Pat. Apl. #52-96771). The resulting chewing gum is a very soft gum with low viscoelasticity.

Unfortunately, the prior art approaches to gluten-based chewing gums have significant limitations in their chewing properties. The prior art gluten-based chewing gums suffer from inferior textural quality, especially in that the gum is soft to chew. The prior inventions also require heat treatment of the chewing gum preparation.

Gluten based chewing gums usually contain a high moisture content which renders these gums susceptible to microbial spoilage. Also, the gluten-based chewing gums are difficult to coat using conventional coating equipment.

SUMMARY OF THE INVENTION

The present invention relates to a nonadhesive chewing gum base which comprises a non-denatured gluten component and a protein condensing agent which promotes cross-linking among gluten proteins forming the gluten component. Tannins are the preferred protein condensing agents.

The preferred chewing gum base composition comprises natural and biodegradable components including gluten, an emulsifying agent, a plasticizing agent, a protein condensing agent and a natural preservative. Optional components of the chewing gum base of the present invention include microbial inhibitors.

Also within the scope of the present invention is a process for the preparation of a non-adhesive chewing gum base comprising a gluten component, a protein condensing agent, an emulsifying agent, a plasticizing agent and a preservative. The process comprises the steps of admixing the gluten component with the water insoluble ingredients of the composition, dispersing the water soluble and water miscible ingredients of the composition in water, adding the water-dispersed ingredients to the insoluble ingredients and mixing until the desired chewing gum texture is reached and recovering a chewing gum bolus, having a rubbery, chewy texture.

The process of the present invention optionally comprises a further step by which the gum base is rolled into flat layers or sticks and frozen to facilitate the forming/cutting operation. The desired shapes are cut from the frozen product and the gum is then thawed. The gluten-based chewing gum may be coated with a hard coating using conventional coating equipment, then packaged.

The process of the present invention can, alternatively, comprise a further step by which the gum base is formed by extruding the gum bolus through a dye which imparts specific shape to the chewing gum. This also imparts an elastic, striated texture to the gluten-based chewing gum.

The resulting gluten-based chewing gum is non-adhesive and possesses stronger chewing properties than prior gluten based chewing gums. In fact, applicants have found that the combination of a protein condensing agent, an acidulant, and emulsifying agent strengthens the chewing properties of the gluten and imparts a more desirable mouthfeel to the gluten base. The result is a more desirable gluten-based chewing gum which is stronger and harder than prior gluten-based chewing gums.

In addition to being a non-tack chewing gum which will not stick to dentures and fillings, the gluten-base chewing gum of the present invention is easily removed from clothing, wood, furniture and most textiles if it is improperly disposed. A chewing gum composition can be made to be completely natural and, therefore, biodegradable.

DETAILED DESCRIPTION OF THE PRESENT INVENTION

The invention relates to a non-adhesive chewing gum base comprising a non-denatured gluten component and a protein condensing agent which promotes cross-linking among gluten proteins forming the gluten component. Other ingredients of the chewing gum base of the present invention include but are not restricted to an emulsifying agent a plasticizing agent, a fibre component, and a preservative. Other optional ingredients include natural flavouring agents, sweeteners, colouring agents and natural preservatives.

The term "protein condensing agent", when used herein, is intended to designate a compound having the ability to strengthen the chewing properties of gluten-based gums by enhancing cross-linking among the gluten proteins forming the chewing gum base. The cross-linking mechanism is described in the literature (see Salunke et al., 1990 Dietary Tannins: Consequences and Remedies, CRC Press, Boca Raton, Fla. and Blouin et al., 1982 Discoloration of proteins by binding with phenolic compounds, Cherry J. P. (Ed.) Food Protein Deterioration Mechanism and Functionality, American Chemical Society, Washington D.C., both herein incorporated by reference).

The preferred protein condensing agents include tannins. It has been found that their use contributes to maintain an acceptable texture in the chewing gum base of the present invention during chewing. The tannins also have the ability to coagulate the proteins of the saliva and the mucous epithelium of the mouth, causing a reduced lubricant action. This results in a slight astringency to the mouthfeel of the chewing gum which is important for suppressing the slimy mouthfeel that can occur in the chewing gum bolus of gluten-based chewing gums. The tannins also reduce adhesion in the chewing gum composition. Preferred tannins which may be used in the context of the present invention include hydrolysable tannins such as tannic acid, and flavonol-based tannins. The tannins can be added in purified, food grade chemicals, or as natural extracts or juices containing them. Preferred levels of tannins in the gluten-based chewing gum range from 0.10 to 0.40% by weight, more preferably from 0.15% to 0.30% by weight and even more preferably from 0.18% to 0.20% by weight.

The major ingredient of the gum-based composition of the present invention is gluten. Various types of commercially available glutens can be used or prepared from wheat or whole wheat flour. The preferred amount of gluten contained in the gum base composition of the present invention varies from 20-90% by weight, preferably from 26 to 67% by weight and, more preferably, from 35 to 50% by weight. It is preferred that a portion of the gluten used be vital gluten. Preferably, between 56 and 100% of the gluten is non-denatured or vital gluten and, more preferably, between 70 and 80% by weight of the gluten of the gum-based composition of the present invention is vital gluten.

A fibre component can be included in the gum base of the present invention, preferably in the form of whole wheat flour. Whole wheat flour is added at a level of 1% to 15% by weight and preferably from 5% to 10% by weight. It was found that adding fibre to the chewing gum base imparts a firmer, stronger texture to the gum base. The fibre component may also include pea fibre, oat bran, or the bran of other cereal grains, either in purified bran form or as a whole grain flour.

A plasticizing agent can also be included in the gum base. Preferred plasticizing agents include glycerol and various polyhydric alcohols, propylene glycol, sorbitol, beeswax, candelilla, paraffin wax, rice bran wax or lecithins. The level of plasticizer can range from 0.05% to 0.80% by weight, preferably from 0.10% to 0.40% by weight and more preferably from 0.15 to 0.25% by weight of the gum base. The plasticizer imparts a softer, smoother texture when the gum is initially chewed.

A preservative, which is preferably a natural preservative, can be added to the gluten gum base to suppress mould growth on the surface of the chewing gum. The preservatives utilized preferably include propionic acid, benzoic acid, and sorbic acid. Levels of the preservative range from 0.05% to 0.2% by weight, preferably 0.10% to 0.2% by weight.

An emulsifying agent can form part in the gum base to provide uniformity in the mixture. Emulsifiers used in the gluten based chewing gum preferably include mono or diglycerides and preferably natural lecithin. The level of emulsifier preferably varies from 0.02% to 0.80% by weight, preferably 0.05% to 0.25% by weight of the gum base.

In the process for the preparation of the non-adhesive chewing gum base of the present invention, commercially available gluten is admixed with the other insoluble ingredients. The water soluble and water miscible ingredients are mixed in water until they are fully dispersed. Distinguishing the ingredients which are suitable for being dispersed in the aqueous phase from those which are not water dispersible will be apparent to one skilled in the art. The aqueous-phase ingredients are then slowly added to the insoluble ingredients while mixing. Mixing is continued until the final desired chewing gum texture is reached, generally, when an elastic cohesive gum bolus is obtained. The speed and time of mixing is dictated by the nature of the desired chewing gum composition. It is important to mention that mixing should be carried out in an manner in which the gum base is not heated. Generally, the temperature of the gum base should not exceed 60° C. Preferably, the temperature should be in the range of 20° to 30° C.

In preparing the chewing gum of the present invention, sweeteners can be added to the chewing gum base. Preferred sweeteners include sucrose, glucose, nutritive sweeteners or non-nutritive sweeteners, such as NutraSweet. Flavors and colors can also be added to the gum base to enhance the desirability of the chewing gum. The flavors and colors can include natural or artificial sources, even though natural sources are preferred. The levels of flavoring and coloring agents vary depending on the specific type of chewing gum desired though well within the preview of those skilled in the art. The sweeteners flavoring agents and coloring agents should be added to the gum base.

After mixing, the gum composition may be rolled into sheets or sticks and frozen. Freezing of the gum may be conducted by conventional food freezing equipment and more preferably by quick freezing methods such as blast or cryogenic freezing. The method of freezing the chewing gum composition is easily determined by those skilled in freezing-technology. Thereafter, the frozen gum becomes hard and can be sliced, diced or cut into various desired shapes.

Mixing and forming may also be accomplished in an extruder. Extruder in this method, refers to an apparatus whereby the gum mixture is forced by mechanical force through a die which imparts a specific shape to the chewing gum. Heating of the gum should be minimized so the temperature of the gum bolus does not exceed 60° C., and preferably ranges between 20° C. to 30° C.

The present invention is further illustrated by the following examples which are not intended to limit the effective scope of the claims. All parts and percentages in the examples and throughout the specification and claims are by weight of the final composition unless otherwise specified.

EXAMPLE 1

A fruit flavored wheat gluten-based chewing gum was prepared as follows:
Ingredient Formulation:

| Ingredient | Percent by Weight |
| --- | --- |
| Gluten | 45 |
| Whole Wheat Flour | 4 |
| Sugar | 9.8 |
| Honey | 1.0 |
| Natural Fruit Flavor | 2.2 |
| Glycerol | 0.8 |
| Lecithin | 0.2 |
| Tannic Acid | 0.2 |
| Natural Orange Color | 1.4 |
| Propionic Acid | 0.2 |
| Water | 35.2 |

The sugar, honey, tannic acid, color, flavor and propionic acid were added to the water and mixed with a mechanical stirrer until dissolved. The lecithin, whole wheat flour and gluten were placed in a Hobart mixing bowl and mixed at slow speed using a B-beater. The aqueous phase ingredients were slowly added to the dry ingredients while mixing. All of the aqueous phase ingredients were added within three minutes, and mixing was continued for 17 minutes. During mixing, the ingredients formed into one large cohesive ball.

The gum bolus was rolled into sheets which were 0.75 cm thick using a rolling pin. The sheets were cut into approximately 10 cm² squares, sealed in polyethylene bags, and placed in frozen storage at −25° C. After 18 hours in frozen storage, the frozen sheets of chewing gum base were diced using a Hobart dicing blade.

The resulting chewing gum base was chewed for up to 5 hours and maintained a non-tack, light and elastic texture throughout the duration of chewing. When discarded on a wooden desk, carpet or cotton clothing, after chewing, the gluten-based gum was easily cleaned from the material by wiping or rubbing with a paper towel.

EXAMPLE 2

A spearmint flavored wheat gluten-based chewing gum was prepared as follows:
Ingredient Formulation:

| Ingredient | Percent by Weight |
| --- | --- |
| Gluten | 44.4 |
| Whole Wheat Flour | 5.8 |
| Sugar | 9.2 |
| Xylitol | 1.9 |
| Natural Spearmint Flavor | 2.2 |
| Glycerol | 0.5 |
| Lecithin | 0.2 |
| Tannic Acid | 0.2 |
| Green Color | 1.4 |
| Propionic Acid | 0.2 |
| Water | 33.8 |

The sugar, xylitol, tannic acid, color, flavor and propionic acid were added to the water and mixed with a mechanical stirrer until dissolved. The lecithin, whole wheat flour and gluten were placed in a Hobart mixing bowl and mixed at slow speed using a B-beater. The aqueous phase ingredients were slowly added to the dry ingredients while mixing. All of the aqueous phase ingredients were added within three minutes, and mixing was continued for 5 minutes. During mixing, the ingredients formed into a dough-like, pasty bolus.

The gum bolus was fed into a laboratory-scale pasta extruder fitted with a die of 0.75 cm diameter hole size. Heat was not applied to the gum base in the extruder. The extruded gluten-based chewing gum was cut into short lengths of approximately 1.0 cm and packaged in polyethylene bags.

The resulting chewing gum base was chewed for up to 5 hours and maintained a light and elastic texture throughout the duration of chewing. The chewed gum would not stick to furniture, carpets, or clothing. When placed on fabric, carpets or wood based furniture, the chewing gum could be easily cleaned from the material by rubbing with a cloth.

EXAMPLE 3

A spearmint flavored chewing gum using beeswax as the plasticizer was prepared as follows:
Ingredient Formulation:

| Ingredient | Percent by Weight |
| --- | --- |
| Gluten | 46.0 |
| Whole Wheat Flour | 3.0 |
| Sugar | 9.2 |
| Xylitol | 1.9 |
| Natural Spearmint Flavor | 2.2 |
| Beeswax | 0.5 |
| Lecithin | 0.5 |
| Tannic Acid | 0.2 |
| Green Color | 1.4 |
| Propionic Acid | 0.2 |
| Water | 34.9 |

The water was heated to 60° C. and the lecithin was dispersed into the warm water. The beeswax was melted and emulsified with the water-lecithin solution. Using an overhead stirrer, the sugar, tannic acid, color, propionic acid, xylitol, and flavor were dispersed into the aqueous phase. The gluten and whole wheat flour were placed into a Hobart mixing bowl and pre-mixed at slow speed using a B-beater mixing paddle. The aqueous phase ingredients were added within 3 minutes and mixing was continued for 17 minutes.

The gum bolus was rolled into sheets which were 0.75 cm thick using a rolling pin. The sheets were cut into approximately 10 cm² squares sealed in polyethylene bags, and placed in frozen storage at −25° C. After 18 hours in frozen storage, the frozen sheets of chewing gum base were diced using a Hobart dicing blade.

The invention thus being described may be varied in many ways. Such variations are not to be regarded as a departure from the embodiment and scope of the invention and all such modifications are intended to be included within the scope of the following claims.

We claim:

1. A non-adhesive chewing gum base comprising a gluten component and a tannin which promotes crosslinking among gluten proteins forming said gluten component.

2. A non-adhesive chewing gum base according to claim 1, wherein the major portion of said gluten component is vital gluten.

3. A non-adhesive chewing gum base according to claim 1, which further comprises an emulsifying agent, a plasticizing agent and a preservative.

4. A non-adhesive chewing gum base according to claim 1, which further comprises an emulsifying agent, a plasticizing agent and a preservative.

5. A non-adhesive chewing gum base according to claim 4, which comprises between 20% and 90% by weight of wheat gluten wherein a major portion of said gluten is vital gluten; between 0.05% and 0.80% by weight of a plasticizing agent; between 0.10% and 0.40% by weight of a tannin having a molecular weight ranging between about 350 and 3,500; between 0.05% and 0.80% by weight of an emulsifier; between 0.05% and 0.80% by weight of a microbial inhibitor; and between 10% and 40% by weight of water and between 1 and 15% by weight of a fibre component.

6. A non-adhesive chewing gum base according to claim 5, wherein the portion of said wheat gluten which is vital gluten ranges from 56 to 100% by weight of said wheat gluten.

7. A non-adhesive chewing gum base according to claim 5, wherein said plasticizing agent is selected from the group consisting of polyhydric alcohols, beeswax, candelilla wax, paraffin wax, lecithins and mixtures thereof.

8. A non-adhesive chewing gum base according to claim 7, wherein said polyhydric alcohol is selected from the group consisting of glycerol, propylene glycol, and sorbitol.

9. A non-adhesive chewing gum base according to claim 5, wherein said emulsifier is selected from the group consisting of monoglycerides, diglycerides, lecithin and mixtures thereof.

10. A non-adhesive chewing gum base according to claim 5, wherein said microbial inhibitor is selected from the group consisting of propionic acid, benzoic acid, sorbic acid and mixtures thereof, and natural extracts or juices containing propionic acid, benzoic acid, sorbic acid and mixtures thereof.

11. A process for the preparation of a non-adhesive chewing gum base composition comprising a gluten component, a tannin, an emulsifing agent, a plasticizing agent and a preservative, said process comprising:
admixing said gluten component with the water insoluble ingredients of said composition;
incorporating the water soluble and water-miscible ingredients in water;
adding the water soluble and water-miscible ingredients to the insoluble ingredients and mixing until the desired chewing gum texture is reached; and
recovering a chewing gum bolus having a rubbery, chewy texture.

12. A process according to claim 11, which comprises a further step by which said gum base is rolled into flat layers or sticks and frozen.

13. A process according to claim 11, which comprises a further step by which said gum base is formed by extruding said gum bolus through a die which imparts a specific shape to said chewing gum.

* * * * *